United States Patent
Mosler et al.

[11] Patent Number: 6,122,988
[45] Date of Patent: Sep. 26, 2000

[54] BRAKING FORCE DISTRIBUTION LINKAGE FOR A MANUALLY ACTUATED PARKING BRAKE SYSTEM

[75] Inventors: Christian Mosler, Stuttgart; Werner Spielmann, Burgstetten; Hartmut Wendt, Merzelweg; Siegfried Emmann, Weinstadt, all of Germany

[73] Assignee: Daimler-Benz Aktiengesellschaft, Stuttgart, Germany

[21] Appl. No.: 09/128,230

[22] Filed: Aug. 3, 1998

[30] Foreign Application Priority Data

Aug. 2, 1997 [DE] Germany .......................... 197 33 552

[51] Int. Cl.⁷ ....................................................... F16C 1/10
[52] U.S. Cl. ........................................... 74/500.5; 188/2 D
[58] Field of Search ........................... 74/500.5, 501.5 R, 74/502.2, 502.4, 502.6; 188/2 D

[56] References Cited

U.S. PATENT DOCUMENTS 5,131,288  7/1992  Barlas ................................. 188/2 D X
5,540,304  7/1996  Hawkins et al. ..................... 188/2 D X
5,671,639  9/1997  Wagner et al. ...................... 188/2 D X

FOREIGN PATENT DOCUMENTS 355153  6/1922  Germany .

Primary Examiner—Mary Ann Battista
Attorney, Agent, or Firm—Kenyon & Kenyon

[57] ABSTRACT

A braking force distribution linkage for a muscular energy-actuated parking brake system of a motor vehicle, in which the braking force is transferred at least via control cables both to one gear of the vehicle's transmission and to the wheels of at least one driven vehicle axle, the wheel brakes on each vehicle axle being respectively articulated via a compensation element. A linkage, lever and balance arm arrangement ensures a sufficient parking-hold effect on a road surface with differing nonskid properties, even in the event of failure of a portion of the braking system.

9 Claims, 1 Drawing Sheet

BRAKING FORCE DISTRIBUTION LINKAGE FOR A MANUALLY ACTUATED PARKING BRAKE SYSTEM

FIELD OF THE INVENTION

The present invention concerns a braking force distribution linkage for a muscular energy-actuated parking brake system of a motor vehicle, in which the braking force is transferred at least via control cables both to one gear of the vehicle's transmission and to the wheels of at least one driven vehicle axle, the wheel brakes on each vehicle axle being respectively articulated via a compensation element.

RELATED TECHNOLOGY

A braking force distribution linkage of this kind in a motor vehicle is in German Patent Document No. 355 153, in which a cable pulley linkage is moved via at least one muscular energy-actuated control element in order to actuate simultaneously the wheel brakes of a rear axle and a transmission brake. The two wheel brakes are interconnected via a control cable that is deflected via a first cable pulley located in front of the rear axle. The pivot bearing of the first cable pulley is in turn connected via a further control cable to the transmission brake. This control cable runs over a second cable pulley, located in front of the transmission, whose pivot bearing is attached to the control element via a cable. The first cable pulley serves as compensation element for the rear wheel brakes, while the second cable pulley is the compensation element between the rear-wheel brake and the transmission brake. The cable pulley linkage distributes the actuation force symmetrically to the wheel brakes and to the transmission brake. Because of the design, a breakage of only one cable or control cable results in failure of the entire braking system.

In addition to this purely mechanical design, most current trucks having a maximum gross weight exceeding five metric tons are equipped with a compressed air-assisted accumulator brake. The complex accumulator brakes generally act either on the wheel brakes of the rear wheel, or on a transmission brake. Both systems have a sufficient parking-hold effect only on a nonskid road surface. If one of the wheels being braked via the drive train is standing on a road surface with poor nonskid properties, such as, for example, gravel or ice, the other wheel can begin to move because the rear-axle differential is not locked.

SUMMARY OF THE INVENTION

An object of the present invention is to provide a braking force distribution linkage which ensures a sufficient parking-hold effect on a road surface with varying nonskid properties even in the event of a failure of part of the braking system. The distribution linkage is intended to require a small installation space and little maintenance, to be easy to adjust, and to be configured as a module.

The present invention provides a braking force distribution linkage for a muscular energy-actuated parking brake system of a motor vehicle, in which the braking force is transferred from a muscular energy-actuated actuation element (60) at least via control cables both to one gear of the vehicle's transmission and to the wheels of at least one driven vehicle axle, the wheel brakes on each vehicle axle being respectively articulated via a compensation element wherein the distribution linkage is a lever linkage which is arranged in or on a housing or frame and comprises both an actuation lever (31) and a balance arm (41). The actuation lever (31) is articulated on the housing (11) or frame with an articulation point (32) located in the region of the one lever end, while it is connected with an articulation point (33) located in the region of the other lever end to a muscular energy-actuated actuation element, either directly or via a control cable (1). A swivel point (34) via which the balance arm (41) is articulated and carried is arranged in the region between the articulation points (32, 33). The balance arm (41) is connected to the compensation element (51) receiving the wheel brake control cables (2, 3) via an articulation point (43) located in the region of the one lever end, and to the transmission brake control cable (4) via an articulation point (42) located in the region of the other lever end. Between the articulation points (42, 43) the balance arm has a swivel point (44) which sits eccentrically, the lever length (a) between the articulation point (42) supporting the transmission brake control cable (4) and the swivel point (44) being greater than the lever length (b) between the other articulation point (43) and the swivel point (44).

The braking force distribution linkage distributes the brake actuation force, via the balance arm and the control cables, in such a way that the braking action of the wheel brakes sufficiently meets legal and/or factory standards for braking action on a road surface with differing nonskid properties. In this context, a large proportion of the brake actuation force is apportioned to the highly effective transmission brake. For example, if duo-servo brakes are used for the transmission brake and the parking brakes, 35% is passed on to each wheel brake of an axle, and 30% to the transmission brake. The combination of transmission and wheel brakes still allows a high braking action on a road surface with differing nonskid properties, even in the event of failure of a wheel brake. For example, if the wheel with the failed parking brake is standing on a smooth ice surface, the wheel standing on a nonskid portion of the road surface prevents the vehicle from sliding despite a considerable loss of braking force. The vehicle is prevented from sliding because the transmission brake, together with the parking brake that is still operating, locks the axle differential. In this way, the wheel standing on the ice surface is held via the differential because the wheel standing on the nonskid road surface is locked. The wheel standing on the ice surface cannot rotate, and thus the vehicle cannot begin to roll.

In addition, the actuation lever carrying the balance arm increases the effective muscle power of the driver actuating the parking brake, so that an external brake-actuating force in not required even for motor vehicles of 5 to 8 metric tons maximum gross weight. An electrical compressor, an air receiver, and the accumulators at the wheel brakes, as employed with the usual compressed air-assisted parking brake, can be omitted.

The braking force distribution linkage is housed, for example, in a compact housing from which only the control cables emerge. This design saves space in the axle region of the motor vehicle.

BRIEF DESCRIPTION OF THE DRAWINGS

Exemplary embodiments of the present invention are elucidated below with reference to the drawings, in which.

DETAILED DESCRIPTION

Figure 1:
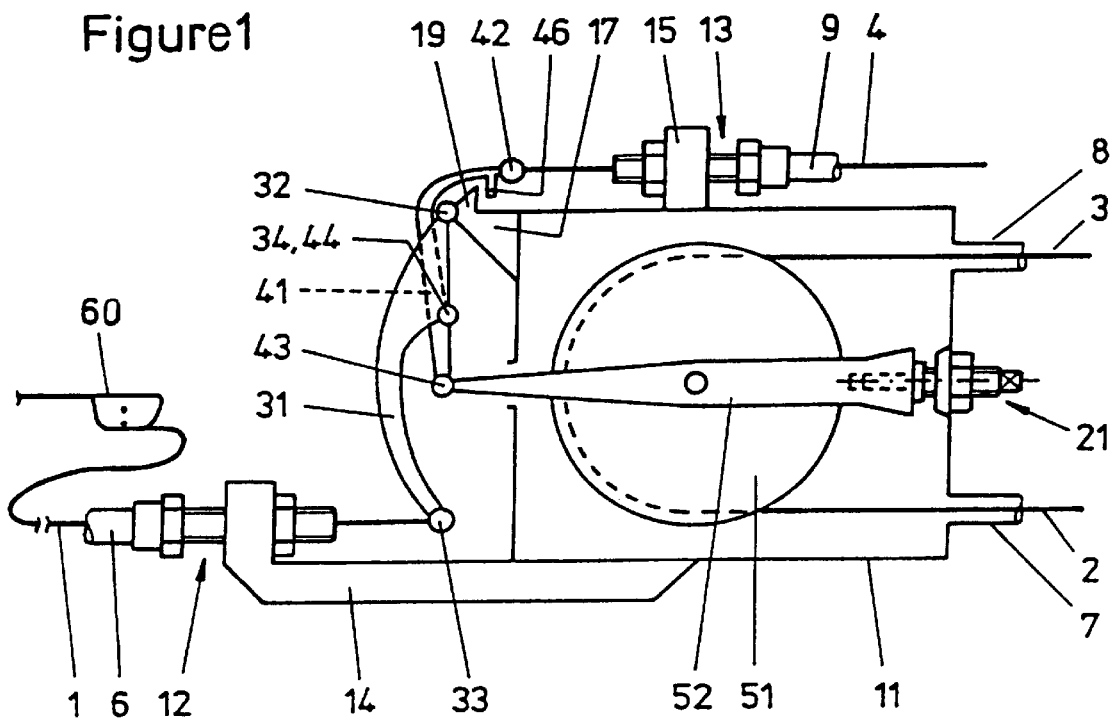
FIG. 1 shows a braking force distribution linkage.

FIG. 1 shows a braking force distribution linkage that is arranged on the motor vehicle between a muscular energy-actuated actuation element and the various brakes that can be set. A control cable 1, arriving from the actuation element, distributes muscular energy to control cables 2, 3 and 4. Control cables 1, 2, 3, 4 are guided in respective protective tubes 6, 7, 8, 9, which are braced against a housing 11 arranged immovably on the motor vehicle. Protective tubes 6 and 9 end at housing 11 in adjustment devices 12 and 13. The latter are, for example, short tubular segments which brace protective tubes 6 and 9, and each having a hex nut and external threads. Adjustment devices 12 and 13 and are threaded into threaded holes on the housing or, as here, on separate supports 14 and 15, and each locked with a nut.

An actuation lever 31 is articulated in a bearing bracket 17 on housing 11. Actuation lever 31 has articulation points 32 and 33 at each end, control cable 1, which actuates the lever linkage, being hooked into the latter. The other articulation point 32 is pivotably mounted in bearing bracket 17. Actuation lever 31 has, in the region between articulation points 32 and 33, a swivel point 34 by way of which it is joined in articulated fashion to a balance arm 41 and its swivel point 44. To increase the effective muscular energy actuating the parking brakes, the lever length between articulation point 33 and swivel point 34 is greater than the lever length between articulation point 32 and swivel point 34.

Balance arm 41 distributes the setting force introduced into swivel point 44 to control cable 4 which leads to the transmission brake, and to compensation element 51 which carries and/or deflects wheel brake control cables 7 and 8. For this purpose, control cable 4 is hooked into articulation point 42. Compensation element 51, which here is, for example, a compensation pulley 51, is pivotably mounted via a pulley carrier at the other articulation point 43. Control cables 2 and 3 are, in the exemplary embodiment, parts of a wire cable which loops approximately 180 degrees around compensation roller 51.

Figure 2:
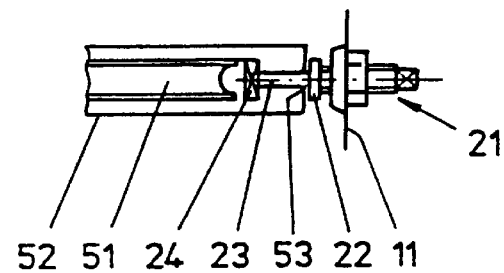
FIG. 2 shows an adjustment device for the compensation element of the linkage of FIG. 1.

Referring now also to FIG. 2, in order not to risk failure of the entire parking brake system in the event of a wire cable break due to tilting of balance arm 41, a stop and adjustment screw 21 is threaded and locked onto housing 11. Screw 21 has a three-part head. Directly adjacent to the threads is an adjuster collar 22, against whose end surface pulley carrier 52 rests adjustably when the parking brake is not actuated. Adjacent to adjuster collar 22 is a shaft 23 which transitions into a stop bar 24. The latter has two flat side surfaces whose spacing corresponds to the diameter of shaft 23. During assembly, stop bar 24 is inserted through an oblong hole 53 present in pulley carrier 52, and positioned in a threaded-in position such that it intersects with oblong hole 53. The depth to which it is threaded into housing 11 depends on the adjustment position of adjuster collar 22.

If a control cable 2 and/or 3 breaks while the parking brake is actuated, pulley carrier 52 comes to rest against the bar portion, projecting beyond shaft 23, of stop bar 24 and thus prevents uncontrolled tilting of balance arm 41, so that at least the transmission brake can still be actuated. Screw 21, which has a square section at its free end for adjustment 180 degrees each way, also changes the stop position as it is adjusted. The total travel of the pulley carrier thereby remains constant.

The wire cable comprising control cables 2 and 3 is optionally attached to compensation pulley 51 over approximately half the loop distance. In this case the pivot angle of compensation pulley with respect to pulley carrier 52 is additionally mechanically limited, so that if one control cable 2 or 3 breaks, the other, unbroken control cable is held, and it still possible to set one wheel brake.

To ensure that the wheel brakes can still be set if the transmission brake control cable 4 breaks, balance arm 41 has, for example in the region of articulation point 42, a stop 46 at which it then comes to rest against a housing stop 19.

What is claimed is:

1. A braking force distribution linkage for a muscular energy-actuated parking brake system of a motor vehicle, a braking force being transferred from a muscular energy-actuated actuation element at least via a transmission brake control cable to at least one gear of a transmission of the motor vehicle, and via wheel brake control cables to wheels of at least one driven vehicle axle, wheel brakes on the at least one driven vehicle axle being articulated via a compensation element receiving the wheel brake control cables, the braking force distribution linkage comprising:

an actuation lever having a first articulation point in a region at one end, a second articulation point in another region at an other end, and a swivel point between the first and second articulation points, the actuation lever being articulated on a housing or frame at the first articulation point and configured to be connected to the muscular energy-actuated actuation element at the second articulation point; and a balance arm being articulated and carried at the swivel point, the balance arm being configured to be connected to the compensation element via a first balance arm articulation point located in a balance arm end region and to the transmission brake control cable via a second balance arm articulation point located in an other balance arm end region, the balance arm having an eccentric balance arm swivel point, a lever length between the second balance arm articulation point and the balance arm swivel point being greater than an other lever length between the first balance arm articulation point and the balance arm swivel point.

2. The braking force distribution linkage as recited in claim 1 wherein the lever length is 60% to 80% of a sum of the lever length and the other lever length.

3. The braking force distribution linkage as recited in claim 1 wherein a first lever length between the first articulation point and an action line for the second articulation point is more than twice as great as a second lever length between the first articulation point and the swivel point.

4. The braking force distribution linkage as recited in claim 1 further comprising a stop, the balance arm resting against the stop in the event of a breakage or overextension of the transmission brake control cable, the stop being arranged on the housing or frame.

5. The braking force distribution linkage as recited in claim 1 further comprising a stop, the balance arm resting against the stop in the event of a breakage or overextension of at least one of the wheel brake control cables, the stop being arranged on the housing or frame.

6. The braking force distribution linkage as recited in claim 5 wherein the stop limits travel of the compensation element both in an actuation direction and opposite to the actuation direction.

7. The braking force distribution linkage as recited in claim 1 wherein the second articulation point is configured to be directly connected to the muscular energy-actuated actuation element.

8. The braking force distribution linkage as recited in claim 1 wherein the second articulation point is configured to be directly connected to the muscular energy-actuated actuation element via a first control cable.

9. The braking force distribution linkage as recited in claim 1 wherein the swivel point and the balance arm swivel point are directly connected.

\* \* \* \* \*